United States Patent [19]

Holladay

[11] Patent Number: 5,492,083
[45] Date of Patent: Feb. 20, 1996

[54] PEST-PROOF FEEDING DEVICE

[76] Inventor: Peggy A. Holladay, 400 Dru Cir., Shreveport, La. 71106

[21] Appl. No.: 295,396

[22] Filed: Aug. 25, 1994

[51] Int. Cl.⁶ ................................................. A01K 5/00
[52] U.S. Cl. ............................................. 119/52.1; 119/62
[58] Field of Search .................................. 119/52.1, 52.2, 119/52.3, 62, 63

[56] References Cited

U.S. PATENT DOCUMENTS

| | | | |
|---|---|---|---|
| 1,212,937 | 1/1917 | Good | 119/62 X |
| 2,589,427 | 3/1952 | Ossmann | 119/62 X |
| 2,933,063 | 4/1960 | Geerlings | 119/62 X |
| 3,121,419 | 2/1964 | Gillespie | 119/62 |
| 3,575,141 | 4/1971 | Elkins | 119/55 |
| 4,029,051 | 6/1977 | McKinney | 119/52 |
| 4,389,976 | 6/1983 | Novak | 119/62 |
| 4,505,228 | 3/1985 | Scott | 119/62 |
| 5,133,291 | 6/1992 | Justice | 119/51.01 |
| 5,404,838 | 4/1995 | Khan | 119/52.1 |

FOREIGN PATENT DOCUMENTS 912388  8/1946  France ........................ 119/62

*Primary Examiner*—Robert P. Swiatek
*Attorney, Agent, or Firm*—John M. Harrison

[57] ABSTRACT

A pest-proof feeding device for containing food for an animal and preventing pests such as snails, ants, birds and roaches from scavenging or contaminating the food, while enabling a pet or other animal to access the food. In a preferred embodiment, the pest-proof feeding device is characterized by a generally dome-shaped housing which is divided into a posterior food storage compartment and an anterior food access compartment having a food access opening which is reversibly sealed by a food access panel pivotally mounted on the housing. The housing may be threadably mounted on a food bowl or shaped in one piece and pelletized animal food is loaded in the food storage compartment and food bowl through a threaded opening provided in the apex of the housing. An animal such as a dog or cat accesses the food in the food bowl by pushing against the food access panel to pivot the food access panel from a closed position into the food access compartment. As the animal eats the food, additional food is dispensed by gravity from the food storage compartment into the food bowl. When the animal finishes eating and removes its head from the food bowl, the food access panel returns to the closed, sealing position, preventing entry of pests into the food bowl.

8 Claims, 2 Drawing Sheets

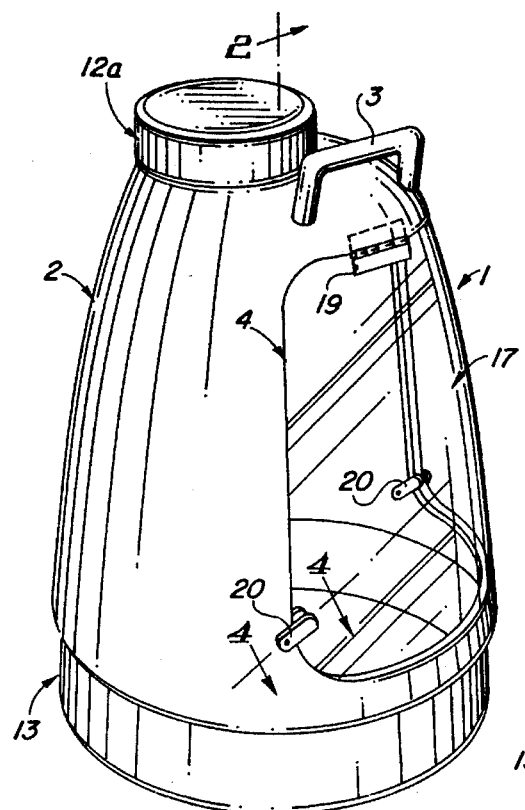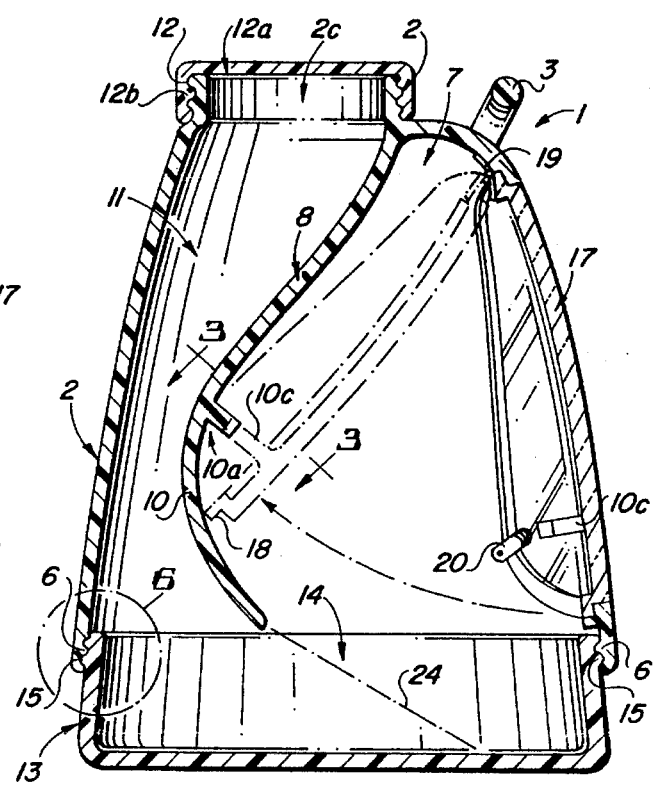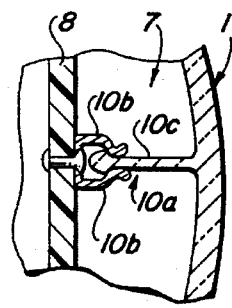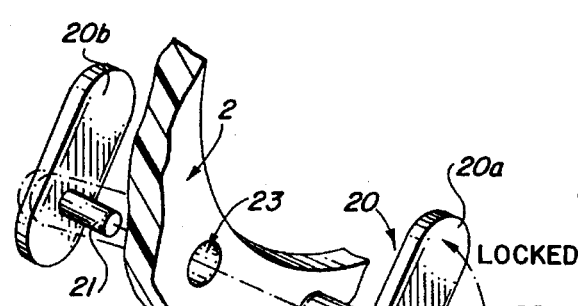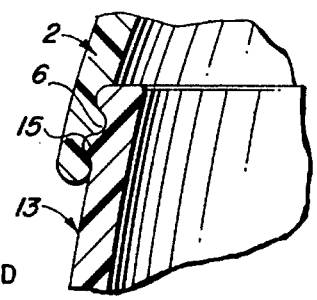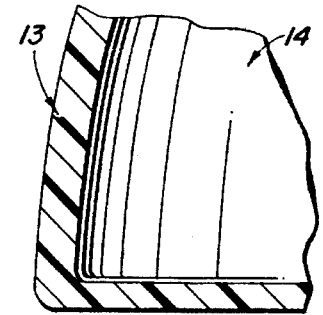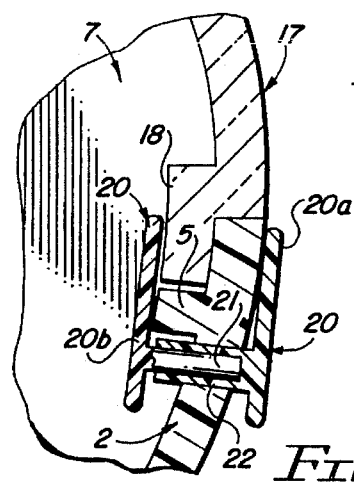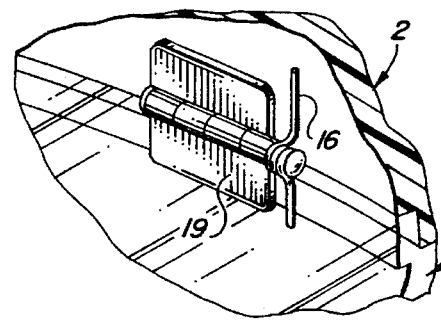

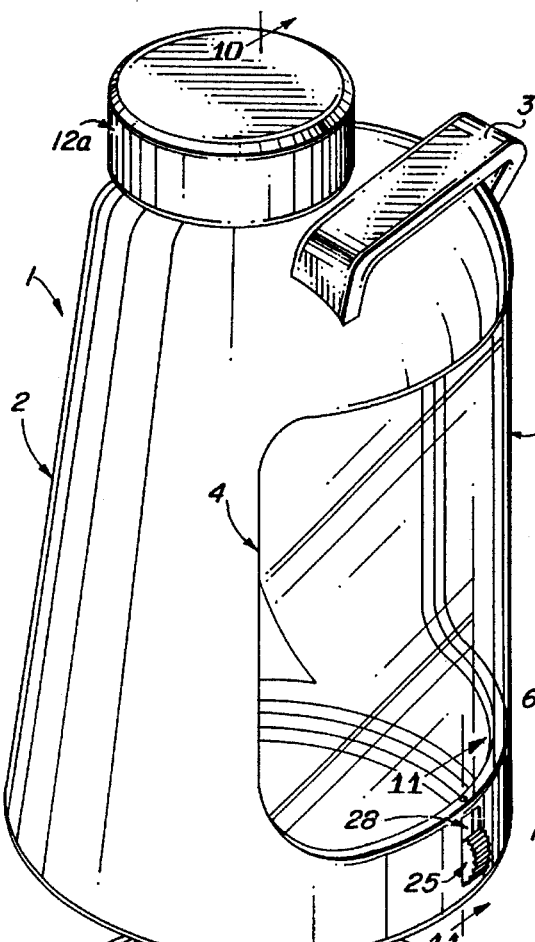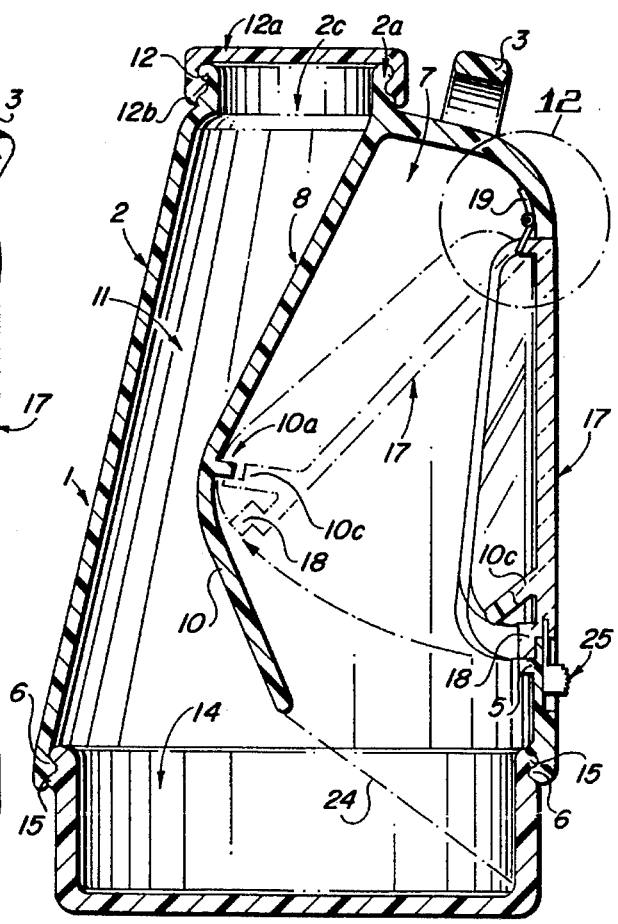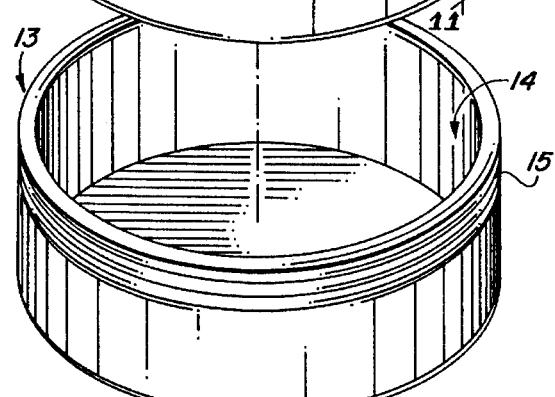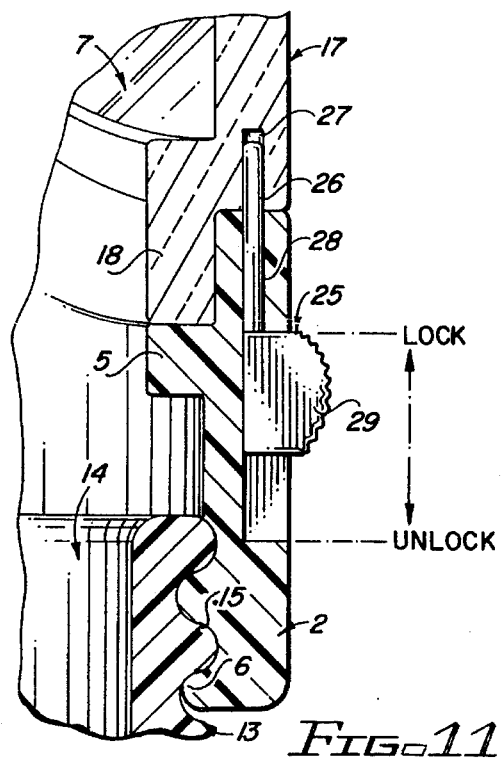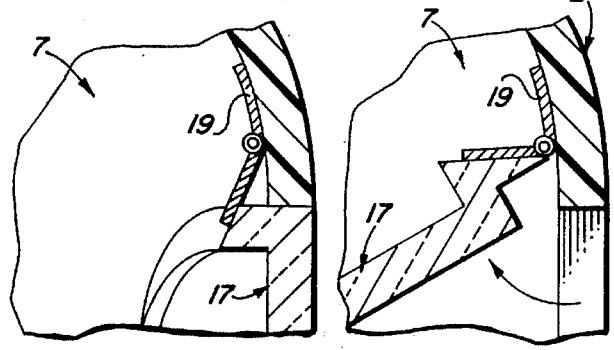

PEST-PROOF FEEDING DEVICE

BACKGROUND OF THE INVENTION

1. Field of the Invention

This invention relates to animal-feeding devices and more particularly, to a pest-proof animal feeding device for containing and dispensing pet or other animal food into a feeding area and sealing the food from ants, roaches, snails and other pests, while enabling a pet or other animal to access the food. In a preferred embodiment of the invention the pest-proof feeding device is characterized by a generally dome-shaped housing which is divided into a posterior food storage compartment and an anterior food access compartment having a food access opening which is reversibly sealed by a pivoting food access panel. In one embodiment, the housing is threaded on a food bowl and the food storage compartment is loaded with pet or other preferably pelletized animal food through a threaded opening provided in the apex of the housing. Some of the food contained in the food storage compartment is dispensed into the food bowl and a pet or other animal accesses the food in the bowl by pushing its head against the food access panel to pivot the food access panel into the food access compartment from a normally closed position sealing the food access opening. As the animal eats food from the bowl, additional food is dispensed by gravity from the food storage compartment into the bowl to replace the food eaten by the animal. When the animal is finished eating and removes its head from the food access compartment, the food access panel returns to the closed, sealing position such that ants, roaches, snails and other insects or pests cannot enter the bowl. A handle is typically molded or otherwise attached to the housing for ease in carrying the feeding device. In another preferred embodiment, the food bowl is formed integrally with the bottom of the housing.

One of the problems associated with using conventional pet food bowls and other devices for feeding pets or other animals is that ants, roaches, snails, rats and other pests or insects frequently enter the pet food bowl or feeding device containing the food and contaminate and/or eat the animal food. The pest-proof feeding device of this invention is designed to be sealingly mounted on a pet food bowl or may be constructed with a food bowl formed integrally therein, and includes a pivoting food access panel which is normally located in a closed, sealing position to prevent ants, roaches, snails, rats and the like from entering the food bowl and scavenging and/or contaminating the food. The food access panel is pivoted open by the head of an animal to access the food in the food bowl and when the animal is finished eating and removes its head from the pest-proof feeding device, the food access panel returns to the closed position to again seal the food in the food bowl from pests.

2. Description of the Prior Art

Various devices are known in the art for containing food to feed a pet or other animal. U.S. Patent No. 3,121,419, dated Feb. 18, 1964, to Russell F. Gillespie, describes a "Pet Feeder and Waterer" characterized by a food and water container which is normally protected by a cover adapted to be moved to an open position by the weight of a pet on a treadle. U.S. Pat. No. 3,575,141, dated Apr. 20, 1971, to Frederick R. Elkins, discloses an "Animal Feeder" characterized by a feed box having a sliding access door which is biased upwardly by a counter-weighted, pivoted platform which slides the access door downwardly to a feeding position responsive to the weight of an animal. An "Animal Feeding and Protective Device" is disclosed in U.S. Pat. No. 4,029,051, dated Jun. 14, 1977, to Roy L. McKinney. The device is characterized by a housing having side walls enclosing a space adapted to receive a feeding dish for an animal. An access opening is provided in one of the side walls, which walls are preferably inclined at an acute angle for receiving and supporting a correspondingly-shaped food dispenser having inclined sides. A lid is provided on the housing to prevent unauthorized access to the feeding dish by an unauthorized animal. U.S. Pat. No. 4,389,976, dated Jun. 28, 1983, to Thaddeus Novak, discloses an "Animal Feeding Apparatus" which supports feeding dishes at an elevated level and protects food contained in the dishes. The apparatus includes a housing having a roof portion which extends over a raised shelf. The shelf includes apertures into which the bottom of the feeding dishes are inserted. A cover overlays the shelf and is pivotally secured in the housing such that it can expose the feeding dishes responsive to operation of a treadle mechanism. U.S. Pat. No. 4,505,228, dated Mar. 19, 1985, to John H. Scott, describes a "Dog Feeder" for protecting and preserving food or fresh water which is to be accessed by a pet. The dog feeder includes a food or water vessel, an insect-isolating tray and a closure for the vessel. The tray surrounds the vessel in the form of a moat and the closure is hinged to the vessel and may be lifted by the dog's nose for permitting the dog's access to the vessel's contents. U.S. Pat. No. 5,133,291, dated Jul. 28, 1992, to Sharon D. Justice, details a "Pet-Feeding Station" for cats or other small animals. The feeding station includes an open-bottomed enclosure which rests on a floor and surrounds one or several feeding dishes. At least one opening is provided in the enclosure to give the animal access to the food dishes. A transparent trap door provided in the top of the enclosure permits easy inspection and access to the food dishes.

It is an object of this invention to provide a pest-proof feeding device for containing food for an animal and sealing the food from roaches, snails, ants and other pests while enabling a pet or other animal to readily access the food.

Another object of the invention is to provide a self-contained, pest-proof feeding device which may be removably mounted on a detachable or integrally-mounted food bowl having a bowl interior or food compartment to enable a pet or other animal to access food pellets contained in the bowl interior while preventing pests such as ants, snails, roaches and the like from entering the pet food bowl and scavenging and/or contaminating the food.

Still another object of this invention is to provide a pest-proof feeding device characterized by a generally dome-shaped housing which is divided into a posterior food storage compartment and an anterior food access compartment having a removable food bowl and a food access opening which is reversibly sealed by a pivoting food access panel, such that a pet or other animal can pivot the food access panel from a normally closed position to an open position located inside the food access compartment and eat pelletized food contained in the food bowl as additional food contained in the food storage compartment is dispensed by gravity into the food bowl to replace the food eaten by the animal.

Yet another object of this invention is to provide a pest-proof feeding device characterized by a dome-shaped housing having a posterior food storage compartment, an anterior food access compartment having a food access opening reversibly sealed by a pivoting food access panel and a food bowl having a bowl interior or food compartment integrally molded with the bottom end of the housing for containing pet or other pelletized or granular animal food which may be accessed by a pet or other animal through the food access opening.

SUMMARY OF THE INVENTION

These and other objects of the invention are provided in a pest-proof feeding device characterized by a generally dome-shaped housing having a posterior food storage compartment separated from an anterior food access compartment having a food access opening which is reversibly sealed by a pivoting food access panel and may be maintained in the open or closed position by adjustable retainers. In one embodiment the housing is removably and threadably mounted on the open end of a food bowl having a bowl interior or food compartment, and pet or other flowable, preferably granular or pelletized animal food is loaded into the food storage compartment through a threaded opening which is provided in the upper end of the housing and is reversibly sealed by a lid. Some of the food is dispensed from the food storage compartment into the bowl interior and a pet or other animal accesses and eats the food contained in the bowl interior by nudging and pivoting the food access panel from a normally closed position which seals the food access opening, to an open position inside the food access compartment. As the food is eaten from the bowl interior, replacement food flows by gravity from the food storage compartment into the bowl interior. In another preferred embodiment, the food bowl is formed integrally with the bottom of the housing.

BRIEF DESCRIPTION OF THE DRAWINGS

The invention will be better understood by reference to the accompanying drawings, wherein:

FIG. 1 is a perspective view of a preferred embodiment of the pest-proof feeding device of this invention;

FIG. 2 is a sectional view taken along section line 2—2 in FIG. 1 of the pest-proof feeding device;

FIG. 3 is a sectional view taken along section line 3—3 in FIG. 2, of the neck retainer element of the pest-proof feeding device, removably engaging a retainer tab element extending from the rear surface of the food access panel element and retaining the food access panel in an open, inwardly-pivoted configuration;

FIG. 4 is a sectional view taken along section line 4—4 in FIG. 1 of a panel latch element of the pest-proof feeding device, illustrated in a locked position preventing the food access panel element from pivoting to an open configuration;

FIG. 5 is an exploded, perspective view, partially in section, of the panel latch element illustrated in FIG. 4, more particularly illustrating a preferred technique for mounting the panel latch element in the housing of the pest proof feeding device;

FIG. 6 is an enlarged sectional view of the food bowl and housing elements of a preferred embodiment of the pest-proof feeding device, taken at section circle 6 in FIG. 2 and more particularly illustrating a thread design for removably mounting the housing on the food bowl;

FIG. 7 is an enlarged sectional view of the food bowl and having elements of the pest-proof feeding device, more particularly illustrating an integral construction of the food bowl and housing;

FIG. 8 is a perspective view, partially in section, of panel hinge and retention spring elements of the pest-proof feeding device, mounted on the housing and food access panel elements of the pest-proof feeding device illustrated in FIG. 1;

FIG. 9 is an exploded, perspective view of the housing and food bowl elements of an alternative, gravity-operated food access panel embodiment of the pest-proof feeding device, illustrating a preferred technique for removably, threadably mounting the housing on the food bowl;

FIG. 10 is a sectional view, taken along section line 10—10 in FIG. 9, of the pest-proof feeding device illustrated in FIG. 9;

FIG. 11 is a sectional view, taken along section line 11—11 in FIG. 9, of an alternative panel lock element of the pest-proof feeding device illustrated in FIG. 9, which panel lock element is mounted in the housing and is illustrated in a locked position preventing the food access panel from pivoting to an open configuration;

FIG. 12 is a sectional view, taken at section circle 12 in FIG. 10, of the hinge element of the pest-proof feeding device illustrated in FIG. 9, more particularly illustrating the food access panel element positioned in the closed configuration; and FIG. 13 is a sectional view, also taken at section circle 12 in FIG. 10 of the hinge element of the pest-proof feeding device illustrated in FIG. 9, more particularly illustrating the food access panel element positioned in the open configuration.

DESCRIPTION OF THE PREFERRED EMBODIMENTS

Referring initially to FIGS. 1, 2, 9 and 10 of the drawings, in a first preferred embodiment the pest-proof feeding device of this invention is generally illustrated by reference numeral 1. The pest-proof feeding device 1 is characterized by a generally dome-shaped housing 2, typically constructed of transparent plastic or polycarbonate. As illustrated in FIGS. 2 and 10, an access compartment partition 8 originates in the upper end or apex of the housing 2 and extends downwardly, dividing the interior of the housing 2 into a posterior food storage compartment 11 and an anterior food access compartment 7 and curving and terminating in a partition neck 10. A housing neck 2a is formed in the upper end or apex of the housing 2 and defines a housing opening 2c, which communicates directly with the food storage compartment 11. A lid 12a includes interior lid threads 12b for engaging exterior neck threads 12 formed on the housing neck 2a to removably seal the housing opening 2c. A handle 3 is provided on the housing 2, adjacent to the housing neck 2a to facilitate easy carrying of the pest-proof feeding device 1.

Referring now to FIGS. 1, 2, 8–10, 12 and 13 of the drawings, a generally rectangular food access opening 4 is shaped in the front surface of the housing 2, as illustrated in FIGS. 1 and 9, and communicates directly with the food access compartment 7. A food access panel 17, typically constructed of a material such as clear plastic or polycarbonate, is pivotally attached to the housing 2 at the upper edge of the food access opening 4 by means of panel hinges 19, which allow the food access panel 17 to pivot into the food access compartment 7, as illustrated in phantom in FIGS. 2 and 10. The panel hinges 19 may be attached to the exterior surfaces of the housing 2 and food access panel 17, as illustrated in FIG. 1, or to the interior surfaces of the housing 2 and food access panel 17, as illustrated in FIGS. 2, 8, 10, 12 and 13. Furthermore, as illustrated in FIG. 8, a retention spring 16 is mounted on each panel hinge 19 to maintain the food access panel 17 in a closed configuration when the housing 2 is configured as illustrated in FIGS. 1 and 2, where the food access panel will not normally close by gravity swing against the housing 2.

Referring now to FIGS. 1, 2, 4 and 5 of the drawings, the edges of the food access panel 17 may be each characterized by a continuous panel flange 18 which is offset inwardly with respect to the plane of the food access panel 17, as illustrated in FIG. 4. When the food access panel 17 is in the closed configuration illustrated in FIGS. 1 and 4, the panel flange 18 engages the interior surface of the housing 2 to seal the food access compartment 7 from the exterior of the housing 2 and prevent the food access panel 17 from pivoting outwardly from the food access opening 4. The panel flange 18 also seats against a continuous interior access opening flange 5 which surrounds the food access opening 4, to further seal the food access compartment 7 from the exterior of the housing 2 when the food access panel 17 is in the closed configuration. As illustrated in FIGS. 1 and 2, a panel latch 20, pivotally mounted on the housing 2 on each side of the food access opening 4, can be selectively pivotally positioned to prevent the food access panel 17 from swinging from the closed configuration illustrated in FIG. 1 to the open, inwardly-pivoted configuration illustrated in phantom in FIG. 2. As illustrated in FIGS. 4 and 5, each panel latch 20 includes an elongated, generally elliptical outside latch element 20a, typically constructed of plastic, and a similar inside latch element 20b. A hollow latch shaft 22 extends perpendicularly from the outside latch element 20a and extends through a latch opening 23, illustrated in FIG. 5, provided in the housing 2. A latch tab 21 extends perpendicularly from the inside latch element 20b and is fixedly secured in the latch shaft 22. The outside latch element 20a may be selectively and manually rotated, as illustrated in FIG. 5, to tightly seat the panel flange 18 against the housing 2 when the food access panel 17 is in the closed configuration, as illustrated in FIG. 4, or to disengage the inside latch element 20b from the panel flange 18 and allow the food access panel 17 to swing into the food access compartment 7.

Referring now to FIGS. 9–11 of the drawings, in a second preferred embodiment of the invention the housing 2 and food access panel 17 are designed such that the food access panel swings into a closed configuration against the housing 2 by gravity. Furthermore, a panel lock 25 is used instead of panel latches 20 for selectively locking the food access panel 17 and preventing the food access panel 17 from pivoting to the open configuration in the food access compartment 7. As illustrated in FIG. 11, the panel lock 25 is characterized by a flat, rectangular lock plate 26, which includes a projecting serrated thumb grip 29 and is slidably seated in a lock slot 28 provided in the housing 2. A lock groove 27 shaped in the food access panel 17, is positioned in alignment with and receives the lock slot 28 when the food access panel 17 is located in the closed configuration. The food access panel 17 is locked in the closed configuration by slidably locating the lock plate 26 upwardly in the lock slot 28 and thereby extending the lock plate 26 into the lock groove 27. The food access panel 17 is selectively unlocked and permitted to swing into the food access compartment 7, by relocating the lock plate 26 downwardly in the lock slot 28, thereby removing the lock plate 26 from the lock groove 27.

Referring now to FIGS. 2, 3 and 10 of the drawings, in another preferred embodiment a neck retainer 10a includes a pair of adjacent retainer blades 10b extending forwardly from the access compartment partition 8 and into the food access compartment 7, as illustrated in FIG. 3. A retainer tab 10c extends rearwardly from the rear surface of the food access panel 17, in alignment with the gap between the retainer blades 10b. As illustrated in phantom in FIGS. 2 and 10, the food access panel 17 may be retained in the open, inwardly-pivoted configuration, as desired, by manually pivoting the food access panel 17 into the food access compartment 7 and forcing the retainer tab 10c between the retainer blades 10b. The food access panel 17 may be returned to the gravity-induced, closed, sealed configuration by manually pulling the lower edge of the food access panel 17 toward the food access opening 4, thereby disengaging the retainer tab 10c from the retainer blades 10b.

Referring now to FIGS. 1, 2, 6, 7, 9 and 10 of the drawings, in still another preferred embodiment of the invention the housing 2 is removably mounted on a food bowl 13 having a food compartment or bowl interior 14. Interior housing threads 6 are formed circumferentially in the bottom end of the housing 2 for removably, threadably engaging exterior bowl threads 15 formed on the circular food bowl 13, such that the food storage compartment 11 and the food access compartment 7 of the housing 2 are in communication with the bowl interior 14 of the food bowl 13, as illustrated in FIGS. 2 and 10. In yet another preferred embodiment of the invention, the food bowl 13 is molded integrally with the housing 2, with the bowl interior 14 defining a food compartment for containing the animal food, as illustrated in FIG. 7.

Referring again to FIGS. 2 and 10 of the drawings, in a typical application, the food storage compartment 11 and bowl interior 14 of the attached food bowl 13 are filled with flowable granular or pelletized pet or other animal food (not illustrated) by unthreading the lid 12a from the housing neck 2a and pouring the food through the housing opening 2c. The food is first dispensed by gravity from the food storage compartment 11 into the bowl interior 14 to a level corresponding roughly to the dashed fill line 24 and then begins to fill the interior of the food storage compartment 11. The lid 12a is then threaded on the housing neck 2a. A pet or other animal (not illustrated) accesses the food contained in the bowl interior 14 by pushing the food access panel 17 with its nose, thereby pivoting the food access panel 17 into the food access compartment 7, such that the animal may eat the food contained in the bowl interior 14. As the food is eaten and removed from the bowl interior 14, the food contained in the food storage compartment 11 continues to fall into the bowl interior 14 by gravity to a level approximately corresponding to the fill line 24, and replace the food eaten by the animal. When the animal is finished eating and removes its head from the food access compartment 7, the food access panel 17 pivots to the closed, sealed configuration, either by the tension in the retention spring 16, as illustrated in FIGS. 1, 2 and 8 or by gravity swing, as illustrated in FIGS. 9, 10, 12 and 13. When the food access panel 17 is in this closed configuration, ants, snails, roaches and other pests are not able to enter the bowl interior 14 or food storage compartment 11 to scavenge and/or contaminate the food contained therein.

Referring again to FIG. 9 of the drawings, it will be appreciated that since the food bowl 13 may be removed from the housing 2, the bowl interior 14, as well as the interior of the housing 2, may be easily and thoroughly cleaned. It will be further appreciated that a pet food bowl (not illustrated) may be placed in the pest-proof feeding device 1 of the embodiment having the food bowl 13 molded integrally with the housing 2, in order to preclude having to clean the bowl interior 14, as desired.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A pest-proof feeding device for containing flavorable, solid food for an animal and preventing pests from scavenging and contaminating the food while enabling an animal to access the food, said pest-proof feeding device comprising a housing having a food access opening, a food compartment provided in said housing, said food compartment provided in communication with said food access opening and a food access panel pivotally carried by said housing for reversibly closing said food access opening by gravity, whereby said food access panel is pivoted by the animal from a first position substantially sealing said food access opening, to a second position in said housing, for accessing the food contained in said food compartment, partition means extending through the interior of said housing to define a food access compartment and a food storage compartment for storing and gravity-dispensing the food into said food compartment responsive to consumption of the food by the animal, a housing opening provided in said housing in communication with said food storage compartment for loading the food into said food storage compartment and bias means carried by said housing and engaging said food access panel for normally biasing said food access panel against said housing.

2. The pest-proof feeding device of claim 1 wherein said food compartment comprises a food bowl and said housing is removably mounted on said food bowl.

3. The pest-proof feeding device of claim 1 wherein said food compartment is molded integrally with said housing.

4. The pest-proof feeding device of claim 1 further comprising a handle mounted on said housing for carrying said pest-proof feeding device.

5. The pest-proof feeding device of claim 4 wherein said food access compartment further comprises a food bowl and said housing is removably mounted on said food bowl.

6. The pest-proof feeding device of claim 4 wherein said food access compartment is molded integrally with said housing.

7. A pest-proof feeding device for containing flavorable, solid food for an animal and excluding pests from the food while enabling an animal to access the food, said pest-proof feeding device comprising a substantially dome-shaped housing having a food access opening; a food access compartment provided in said housing in communication with said food access opening; a food supply compartment provided in said housing in direct communication with said food access compartment for containing the food; a food storage compartment provided in said housing above and in communication with said food supply compartment, for storing and dispensing the food by gravity into said food supply compartment; a housing opening provided in the top of said housing in communication with said food storage compartment for selectively loading the food into said food storage compartment; a panel hinge attached to said housing adjacent to said food access opening and a transparent food access panel hingedly attached to said panel hinge for reversibly closing said food access opening by gravity, whereby said food access panel is pivotal by the animal from a first position substantially sealing said food access opening, to a second position in said food access compartment for accessing the food in said food compartment; at least one panel latch mounted on said housing for selectively engaging and locking said food access panel in said first position; a lid threadably mounted on said housing for reversibly sealing said housing opening; and a handle provided on said housing adjacent to said housing opening for carrying said pest-proof feeding device.

8. A pest-proof feeding device for containing flavorable, solid animal food and excluding pests from the animal food while allowing an animal to access the animal food, said pest-proof feeding device comprising a food bowl having a bowl interior for containing the animal food; a substantially dome-shaped housing threadably mounted on said food bowl and having a food access opening; a food storage compartment located in said housing above and in communication with said bowl interior for storing and dispensing the animal food into said bowl interior; a housing opening provided in the top of said housing in communication with said food storage compartment for loading the food into said food storage compartment; a food access compartment located in said housing adjacent to said food storage compartment, said food access compartment provided in communication with said food access opening and said bowl interior; a panel hinge attached to the interior surface of said housing above said food access opening; a food access panel attached to said panel hinge for normally closing said food access opening; a retention spring mounted on said panel hinge and engaging said housing and said food access panel for normally biasing said panel against the interior surface of said housing, whereby said food access panel is pivoted from a first position sealing said food access opening to a second position located in said food access compartment by the animal, for accessing the food in said bowl interior; a panel lock slidably mounted in said housing for reversibly engaging and locking said food access panel; a lid threadably mounted on said housing for reversibly sealing said housing opening; and a handle provided on said housing adjacent to said housing opening for carrying said pest-proof feeding device.

* * * * *